United States Patent [19]
Vedula et al.

[11] Patent Number: 5,959,059
[45] Date of Patent: Sep. 28, 1999

[54] THERMOPLASTIC POLYETHER URETHANE

[75] Inventors: Ravi Ram Vedula, North Ridgeville; Stanley Raymond Goscewski, Lorain, both of Ohio

[73] Assignee: The B.F. Goodrich Company, Richfield, Ohio

[21] Appl. No.: 08/872,663

[22] Filed: Jun. 10, 1997

[51] Int. Cl.$^6$ .................................................. C08G 18/48
[52] U.S. Cl. .............................. 528/76; 528/79; 528/906; 428/364; 428/423.1; 152/151; 473/351
[58] Field of Search ................................ 528/76, 79, 906; 428/364, 423.1; 152/151; 473/351

[56] References Cited

U.S. PATENT DOCUMENTS

| | | | |
|---|---|---|---|
| 3,016,364 | 1/1962 | Müller et al. | 528/79 |
| 4,120,850 | 10/1978 | Pechold | 528/46 |
| 4,202,957 | 5/1980 | Bonk | 528/77 |
| 4,447,590 | 5/1984 | Szycher | 528/76 |
| 4,877,856 | 10/1989 | Hall et al. | 528/76 |
| 5,545,706 | 8/1996 | Barksby et al. | 528/49 |

FOREIGN PATENT DOCUMENTS

| | | |
|---|---|---|
| 0 343 985 | 11/1989 | European Pat. Off. . |
| PCT/US98/ 11367 | 11/1998 | WIPO . |

OTHER PUBLICATIONS

Saunders & Frisch; Polyurethanes; pp. 284,285,294, 1962

*Primary Examiner*—Rachel Gorr
*Attorney, Agent, or Firm*—David P. Dureska; Daniel J. Hudak

[57] ABSTRACT

A thermoplastic polyether polyurethane having good rebound resilience and low hysteresis properties is prepared by the reaction of a diisocyanate with a hydroxyl terminated polyether having a weight average molecular weight of at least 1,400 and a glycol chain extender. The polyether contains alkylene oxide repeat units having from 2 to 6 carbon atoms and the chain extender glycol has from 2 to 16 carbon atoms. The amount of the chain extender glycol is from about 0.25 to about 2 moles per mole of the polyether.

29 Claims, No Drawings

THERMOPLASTIC POLYETHER URETHANE

FIELD OF THE INVENTION

The present invention relates to thermoplastic polyether urethanes which have very high rebound values and low hysteresis values. More particularly, the present invention relates to such urethanes which are derived from high molecular weight hydroxyl terminated polyether intermediates, and preferably aromatic diisocyanates and aromatic glycol chain extenders.

BACKGROUND OF THE INVENTION

Heretofore, thermoplastic polyurethanes generally had suitable properties with regard to abrasion resistance, and the like. However, such polyurethanes were generally not suitable in applications wherein the following properties are desired: high melting point, low density, low tensile set, low compression set, and especially good rebound and low hysteresis.

SUMMARY OF THE INVENTION

The present invention relates to a polyether urethane having good physical properties which is prepared as by the melt polymerization of a hydroxyl terminated polyether intermediate and a chain extender with a diisocyanate. An important aspect of the invention is that the polyether has a weight average molecular weight such as at least 1,400 with higher molecular weights yielding better results. A large number of different diisocyanates can be utilized and the amount or ratio of the moles of diisocyanate to the moles of hydroxylterminated polyether and chain extender is generally from about 0.95 to about 1.05. Another important aspect of the present invention is that the chain extender is a substantially non-branched glycol with aromatic glycols being preferred.

DETAILED DESCRIPTION OF THE INVENTION

The thermoplastic polyurethanes of the present invention desirably have a hydroxyl terminated polyether intermediate containing alkylene oxide repeat groups of from 2 to 6 carbon atoms, desirably from 2 to 4 carbon atoms, e.g., ethylene oxide or propylene oxide, with 4 carbon atoms, i.e., tetramethylene or butylene oxide being preferred, or combinations thereof. The polyether intermediate desirably is a homopolymer and preferably has a high weight average molecular weight, so that good properties are obtained, of at least about 1,400, desirably at least about 2,000, and preferably at least about 2,500 to about 5,000 or 10,000. Blends of such molecular weight polymers can also be utilized while blends containing low molecular weight components are avoided since the urethane polymer thereof yields poor physicla properties such as hysteresis and rebound. The hydroxyl terminated polyethers which are utilized as the intermediate are well know to the art and literature and are commercially available, as for example, Polymeg 2000 from Quaker Oats or Terethane 2900 from DuPont.

The thermoplastic polyether urethanes of the present invention are generally produced by the so-called one-shot process as, for example, where the hydroxyl terminated polyether intermediate, the chain extender and the diisocyanate are added together, mixed and polymerized. Desirably, the polyether and chain extender are added in one stream and the diisocyanate added in another stream.

While aliphatic diisocyanates can be utilized, aromatic diisocyanates are highly preferred. Moreover, the use of multifunctional isocyanate compounds, i.e., triisocyanates, etc. which cause crosslinking, are avoided and thus the amount thereof is generally less than 4 mole percent and preferably less than 2 mole percent based upon the total moles of all of the various isocyanates utilized. The diisocyanates can contain from about 4 to about 20 carbon atoms with about 6 or to 16 being preferred. Examples of aliphatic diisocyanates include hexamethylene diisocyanate, isophorone diisocyanate (IPDI), methylene bis(4-cyclohexylisocyanate), 1,4-cyclohexyl diisocyanate (CHDI) and the like. Examples of preferred aromatic diisocyanates include 1,4-diisocyanatobenzene (PPDI), 1,5-naphthalene diisocyanate (NDI), xylene diisocyanate (XDI), isomers of toluene diisocyanate (TDI), with 4,4'methylenebis (phenylisocyanate), isomers thereof, or oligomers thereof, collectively known as MDI, being especially preferred.

The glycol chain extenders utilized in the present invention are preferably straight chain and crystalline. That is, the weight of any branches of all of the chain extenders utilized based upon the total weight of all chain extenders is generally less than 15 percent and preferably less than 10 percent by weight. Crystallinity helps prevent tackiness and is better achieved when the chain extender has an even number of carbon atoms therein. The chain extenders can be aliphatic with aromatic glycol chain extenders being preferred and contain a total number of carbon atoms of from about 2 to about 16, and preferably from about 6 to about 12. Examples of suitable glycol chain extenders include ethylene glycol, propane glycol, butane glycol, pentane glycol, hexane glycol, benzene glycol, and xylenene glycols which is a mixture of 1,4-di(hydroxymethyl)benzene 1,2-di(hydroxymethyl)benzene. Benzene glycol is preferred and specifically includes hydroquinone, i.e., bis(beta-hydroxyethyl)ether also known as 1,4-di(2-hydroethoxy) benzene; resorcinol, i.e., bis(beta-hydroxyethyl)ether also known as 1,3-di(2-hydroxyethyl)benzene; catechol, i.e., bis (beta-hydroxyethyl)ether also known as 1,2-di(2-hydroxyethoxy)benzene; and combinations thereof. The amount of the glycol chain extender is generally from about 0.25 to about 2.0, desirably from about 0.5 to about 1.5, and preferably from about 0.70 to about 1.0 mole per mole of the hydroxyl terminated polyether intermediate.

The mole ratio or amount of the total moles of the one or more different diisocyanates is generally from about 0.95 to about 1.05, and preferably from about 0.98 to about 1.03, based upon the total moles of the one or more hydroxyl terminated polyether intermediates and the one or more chain extenders.

The hydroxyl terminated polyether intermediate, the diisocyanate, and the chain extender, as noted above, are generally added together and reacted in accordance with any conventional urethane reaction method. Preferably, the thermoplastic polyether urethane forming components of the present invention are melt polymerized in the presence of a suitable mixer such as a Banbury, or preferably an extruder. Desirably, the diisocyanate is added separate to the extruder and the polyether intermediate is added as a blend with the chain extender. Suitable processing or polymerization starting temperatures of the diisocyanate is from about 100° C. to about 200° C., and desirably from about 100° to 150° C. and for the blend of the chain extender glycol and polyether intermediate from about 100° C. to about 220° C. and preferably from about 150° to about 200° C. Suitable mixing times in order enable the various components to react and form the thermoplastic polyether urethanes of the present invention are generally from about 2 to about 10 and desirably from about 3 to about 5 minutes.

It is often desirable to utilize catalysts such as stannous and other metal carboxylates as well as tertiary amines. Examples of metal carboxylate catalysts include stannous octoate, dibutyltin dilaurate, phenyl mercuric propionate, lead octoate, iron acetylacetonate, magnesium acetylacetonate, and the like, whereas examples of tertiary amine catalysts include triethylene diamine, and the like. The amount of the one or more catalysts is low, generally from about 50 to about 100 parts by weight per million parts by weight of the end polymer formed.

The weight average molecular weight of the polymerized thermoplastic polyether urethanes of the present invention generally range from about 100,000 to about 500,000, desirably from about 150,000 to about 400,000, and preferably from about 175,000 to about 300,000.

The thermoplastic polyether urethanes of the present invention can be mixed with various conventional additives or compounding agents such as fillers, thixotropic agents, extenders, pigments, plasticizers, lubricants, UV absorbers, and the like. Fillers include talc, silicates, clays, calcium carbonate, and the like. The above-noted additives and compounding agents can be used in conventional amounts known to the art and literature.

The thermoplastic polyether urethanes of the present invention have been found to have numerous good and/or unexpected properties. One such property is rebound, for example, as measured by the Bay Shore Rebound Test, i.e., ASTM No. D-2632. Rebound values of at least 60 percent, desirably at least 65 percent, and preferably at least 70 and even 75 percent are achieved. Another favorable property is that the thermoplastic composition has low hysteresis. That is, the hysteresis loss for a 10 percent elongation at room temperature (23° C.) is 15 percent or less, generally 12 percent or less, and desirably 9 percent or less, and preferably 6 percent or less. The hysteresis loss at 20 percent elongation at room temperature is 30 percent or less, generally 25 percent or less, desirably 20 percent or less, and preferably 15 percent or less. The thermoplastics also have improved low tensile set (ASTM D-412), i.e., generally 10 percent or less, desirably 8 percent or less, and preferably 6 percent or less. Low compression set values according to ASTM D-395 at 23° C. for 22 hours of 25 percent or less, 12 percent or less, and preferably 9 percent or less are obtained. Desirably, the compression set at 70° C. for 22 hours is generally 40 percent or less, desirably 30 percent or less, and preferably 25 percent or less. Unlike prior polyether urethanes, the urethanes of the present invention according to a differential scanning calorimeter have high melting points, for example, from about 170° C. to about 230° C. and preferably from about 180° C. to about 220° C. The polymers of the present invention also have low densities, for example, specific gravities of 1.10 or less, desirably 1.08 or less and even 1.06 or 1.04 and less. Additionally, the thermoplastic polyether urethane polymers have a Shore D hardness of at least 15 or 20, and even at least 25, 30 or 35 10 to about 50 or 60.

In addition to the above noted properties, the polyether urethanes of the present invention have favorable properties exhibited by conventional thermoplastic urethanes such as good tear resistance, good abrasion resistance, hydrolytic stability, and the like.

The polymers of the present invention can be utilized wherever such favorable properties are desired. For example, the thermoplastic polyether urethanes of the present invention can be utilized as a solid core in golf balls; as shoe soles; they can be melt spun and used as fibers in hosiery, sports ware, active wear, and in elastic trim such as leg bands and diapers; coil cords such as telephone cords; made into pneumatic tubes; used as profile belts with regard to small motors or for other drive or idler belts; used as recreational wheels such as in-line skate wheels (roller blades), roller skates, or skate boards; and the like.

The invention will be better understood by reference to the following examples which serve to illustrate, but not to limit the scope of the present invention.

EXAMPLES

Polyester polyol synthesis: All the examples involving polyester polyols were condensation products of 1,4-butane diol (BDO) and adipic acid. These adipate esters were prepared by reacting adipic acid and BDO with the overall diol/acid mole ratio being greater than 1.0 and varied depending on the desired molecular weight of the polyol. The reactants were charged to a reactor under dry nitrogen blanket, and held at 125° C. under atmospheric pressure until the initial waters of condensation ceased to be evolved. Vacuum was then applied with increasing temperature, and 15 ppm stannous chloride catalysis as necessary, and additional waters of condensation removed until the acid number was reduced below 0.8, whereupon the reaction product was cooled and recovered.

Polymers were prepared by to a random melt polymerization method. In this method, the polyol and chain extender are blended together at about 60° C. The blend is then heated to 100–200° C. as desired. Diphenylmethane diisocyanate (MDI) is heated separately to 100–150° C. as desired, then mixed with the blend. The reactants are vigorously mixed for about 3 minutes, during which time the temperature typically increases to 200–250° C. The polymer melt is discharged into a cooled pan, then cured at 70° C. for 1 week after which the polymer is tested for its various properties.

Example 1

186.83 g of poly (tetramethylene adipate) glycol (PTMAG) with a molecular weight (MW) of 870 (end-group analysis) and 13.17 g of 1.4-butane diol (BDO) were blended together at 110° C. to yield a blend molecular weight (BMW) of 555. 90.09 g of 4,4'-diphenylmethane diisocyanate (MDI) was heated to 110° C. and then reacted with the blend to give the polymer designated as Example 1.

Example 2

180.24 g of PTMAG with a MW of 2100 (end-group analysis) and 19.76 g of BDO were blended together at 110° C. to yield a BMW of 655. 76.33 g of MDI was heated to 110° C. and then reacted with the blend to give the polymer designated as Example 2.

Example 3

168.90 g of PTMAG with a MW of 2159 (end-group analysis) and 31.10 g of benzene glycol (BG) were blended together at 110° C. to yield a BMW of 850. 59.04 g of MDI was heated to 110° C. and then reacted with the blend to give the polymer designated as Example 3.

Example 4

178.67 g of PTMAG with a MW of 2159 (end-group analysis) and 21.33 g of BG were blended together at 110° C. to yield a BMW of 1050. 47.74 g of MDI was heated to 110° C. and then reacted with the blend to give the polymer designated as Example 4.

Example 5

185.32 g of PTMAG with a MW of 2159 (end-group analysis) and 14.68 g of BG were blended together at 110° C. to yield a BMW of 1250. 40.20 9 of MDI was heated to 110° C. and then reacted with the blend to give the polymer designated as Example 5.

Example 6

119.23 g of poly (tetramethylene ether) glycol (PTMEG) with a MW of 670 (end-group analysis) and 30.76 g of BG were blended together at 120° C. to yield a BMW of 450. 60.72 g of MDI was heated to 120° C. and then reacted with the blend to give the polymer designated as Example 6.

Example 7

120 g of PTMEG with a MW of 990 (end-group analysis) and 30 g of BG were blended together at 100° C. to yield a BMW of 550. 55.37 g of MDI was heated to 100° C. and then reacted with the blend to give the polymer designated as Example 7.

Example 8

182.29 g of PTMEG with a MW of 1000 (end-group analysis) and 17.71 g of BG were blended together at 110° C. to yield a blend molecular weight of 736. 67.93 g of MDI was heated to 110° C. and then reacted with the blend to give the polymer designated as Example 8.

Example 9

191.29 g of PTMEG with a MW of 1000 (end-group analysis) and 8.71 g of BG were blended together at 110° C. to yield a blend molecular weight of 850. 58.82 g of MDI was heated to 110° C. and then reacted with the blend to give the polymer designated as Example 9.

Example 10

268.71 g of PTMEG with a MW of 1040 (end-group analysis) and 31.29 g of BG were blended together at 110° C. to yield a BMW of 495. 101.27 g of MDI was heated to 110° C. and then reacted with the blend to give the polymer designated as Example 10.

Example 11

178.22 g of PTMEG with a MW of 1422 (end-group analysis) and 21.77 g of BG were blended together at 110° C. to yield a BMW of 850. 58.82 g of MDI was heated to 110° C. and then reacted with the blend to give the polymer designated as Example 11.

Example 12

178.23 g of PTMEG with a MW of 1422 (end-group analysis) and 21.77 g of BG were blended together at 130° C. to yield a BMW of 850. 58.93 g of MDI was heated to 130° C. and then reacted with the blend to give the polymer designated as Example 12.

Example 13

200 g of PTMEG with a MW of 1422 (end-group analysis) and 13.91 g of BG were blended together at 110° C. to yield a BMW of 1014.28. 52.99 g of MDI was heated to 110° C. and then reacted with the blend to give the polymer designated as Example 13.

Example 14

178.32 g of PTMEG with a MW of 1761 (end-group analysis) and 21.64 g of BG were blended together at 130° C. to yield a BMW of 950. 52.71 g of MDI was heated to 130° C. and then reacted with the blend. A drop stannous octoate (catalyst) was added to the reaction after 2 minutes had elapsed since the start of the reaction. The resulting polymer has been designated as Example 14.

Example 15

182.83 g of PTMEG with a MW of 1761 (end-group analysis) and 17.17 g of BG were blended together at 150° C. to yield a BMW of 1050. 47.64 g of MDI was heated to 150° C. and then reacted with the blend. A drop of stannous octoate (catalyst) was added to the reaction after 2 minutes had elapsed since the start of the reaction. The resulting polymer has been designated as Example 15.

Example 16

277.83 g of PTMEG with a MW of 2025 (end-group analysis) and 22.17 g of BG were blended together at 150° C. to yield a BMW of 1204. 62.47 g of MDI was heated to 150° C. and then reacted with the blend. A drop of stannous octoate (catalyst) was added to the reaction after 2 minutes had elapsed since the start of the reaction. The resulting polymer has been designated as Example 16.

Example 17

150 g of poly (propylene ether) glycol (PPG) with a MW of 2226 (end-group analysis) and 11.21 g of BG were blended together at 150° C. to yield a BMW of 1300. 31.25 g of MDI was heated to 120° C. and then reacted with the blend. A drop of stannous octoate (catalyst) was added to the reaction after 2 minutes had elapsed since the start of the reaction. The resulting polymer has been designated as Example 17.

Example 18

200 g of PTMEG with a MW of 2953 (end-group analysis) and 11.26 g of BG were blended together at 170° C. to yield a BMW of 1696. 31.29 g of MDI was heated to 140° C. and then reacted with the blend. A drop of stannous octoate (catalyst) was added to the reaction after 2 minutes had elapsed since the start of the reaction. The resulting polymer has been designated as Example 18.

Example 19

200 g of PTMEG with a MW of 2953 (end-group analysis) and 12.61 g of BG were blended together at 170° C. to yield a BMW of 1618. 33.05 g of MDI was heated to 140° C. and then reacted with the blend. A drop of stannous octoate (catalyst) was added to the reaction after 2 minutes had elapsed since the start of the reaction. The resulting polymer has been designated as Example 19.

Example 20

200 g of PTMEG with a MW of 2953 (end-group analysis) and 9.92 g of BG were blended together at 170° C. to yield a BMW of 1782. 29.64 g of MDI was heated to 140° C. and then reacted with the blend. A drop of stannous octoate (catalyst) was added to the reaction after 2 minutes had elapsed since the start of the reaction. The resulting polymer has been designated as Example 20.

Pertinent information with regard to Examples 1 through 20 are set forth in Table I, along with rebound data. Table II sets forth pertinent information with regard to various physical properties of selected examples. Table III relates to hysteresis data concerning selected examples.

TABLE I

| Ex. # | Polyol Type | Polyol Source | Polyol Molecular Weight | Chain Extender | Chain Extender/ Polyether Mole Ratio | Blend Molecular Weight | Blend Temp. ° C. | MDI Temp. ° C. | Rebound (%) | Shore D |
|---|---|---|---|---|---|---|---|---|---|---|
| 1 | Ester | BFG | 870 | BDO | 0.68 | 555 | 110 | 110 | 34 | 35 |
| 2 | Ester | BFG | 2100 | BDO | 2.56 | 655 | 110 | 110 | 37 | 33 |
| 3 | Ester | BFG | 2159 | BG | 2.01 | 850 | 110 | 110 | 41 | 36 |
| 4 | Ester | BFG | 2159 | BG | 1.30 | 1050 | 110 | 110 | 53 | 29 |
| 5 | Ester | BFG | 2159 | BG | 0.86 | 1250 | 110 | 110 | 56 | 23 |
| 6 | PTMEG | Quaker Oats (QO) POLYMEG | 670 | BG | 0.87 | 450 | 120 | 120 | 24 | 50 |
| 7 | PTMEG | QO POLYMEG | 990 | BG | 1.25 | 550 | 100 | 100 | 44 | 50 |
| 8 | PTMEG | QO POLYMEG | 1000 | BG | 0.49 | 736 | 110 | 110 | 57 | 30 |
| 9 | PTMEG | QO POLYMEG | 1000 | BG | 0.23 | 850 | 110 | 110 | 56 | 13 |
| 10 | PTMEG | QO POLYMEG | 1040 | BDO | 1.35 | 495 | 110 | 110 | 40 | 33 |
| 11 | PTMEG | QO POLYMEG | 1422 | BG | 0.87 | 850 | 110 | 110 | 59 | 30 |
| 12 | PTMEG | QO POLYMEG | 1422 | BG | 0.87 | 850 | 130 | 130 | 63 | 35 |
| 13 | PTMEG | QO POLYMEG | 1422 | BG | 0.49 | 1014 | 110 | 110 | 54 | 19 |
| 14 | PTMEG | QO POLYMEG | 1761 | BG | 1.08 | 950 | 150 | 150 | 62 | 37 |
| 15 | PTMEG | QO POLYMEG | 1761 | BG | 0.84 | 1050 | 150 | 150 | 67 | 33 |
| 16 | PTMEG | QO POLYMEG | 2025 | BG | 0.84 | 1204 | 150 | 150 | 72 | 28 |
| 17 | PPG | Arco R2446 | 2226 | BG | 0.84 | 1300 | 150 | 120 | 58 | 19 |
| 18 | PTMEG | DuPont T2900[1] | 2953 | BG | 0.84 | 1696 | 170 | 140 | 77 | 23 |
| 19 | PTMEG | DuPont T2900 | 2953 | BG | 0.94 | 1618 | 170 | 140 | 73 | 21 |
| 20 | PTMEG | DuPont T2900 | 2953 | BG | 0.74 | 1782 | 170 | 140 | 73 | 21 |

[1]Terethane 2900

TABLE II

| Properties | Test Method | Example 2 | Example 10 | Example 8 | Example 16 | Example 18 |
|---|---|---|---|---|---|---|
| Hardness Shore D | ASTM D-2240 | 33 | 33 | 30 | 28 | 23 |
| Specific Gravity (g/cc) | ASTM D-792 | 1.20 | 1.12 | 1.10 | 1.06 | 1.04 |

TABLE II-continued

| Properties | Test Method | Example 2 | Example 10 | Example 8 | Example 16 | Example 18 |
|---|---|---|---|---|---|---|
| Tensite Strength (psi) | ASTM D-412/D-638 | 6500 | 7000 | 3400 | 3599 | 4266 |
| Elongation (%) | ASTM D-412/D-638 | 550 | 570 | 710 | 748 | 752 |
| Tensite set (%) | ASTM D-412 | 10 | 13 | 10 | 5.6 | — |
| Compression set (%) | ASTM D-395 - 22 hrs @ 23° C. | 23 | 22 | 18 | 7.8 | — |
| | ASTM D-395 - 22 hrs @ 70° C. | 65 | 70 | 61 | 22.9 | — |
| Tear Strength (lb/in) | ASTM D 624, DieC | 500 | 475 | 315 | 389 | — |
| Melting Point (° C.) | DSC | 151 | 160 | 170 | 189 | 211 |
| Glass Transition Temp. (° C.) | DSC | −32 | −40 | −45 | −69 | −70 |
| Rebound Resilience (%) | ASTM D-2632 | 37 | 40 | 57 | 72 | 77 |
| Flex Modulus (psi) | ASTM D-790 | 4000 | 4530 | 2480 | 2330 | — |

TABLE III

Hysteresis

| | % Hysteresis | | |
|---|---|---|---|
| Example No. | 10% Elongation | 20% Elongation | 200% Elongation |
| 8 | 14.2 | 26.3 | 51.0 |
| 16 | 10.6 | 24.7 | 49.3 |
| 18 | 5.6 | 11.9 | 39.7 |

Test for Hysteresis: The effect of hysteresis is quantitified as a loss of energy during a deformation cycle. It is measured by subtracting the area under the relaxation curve from the area under the extension curve of a stress-strain diagram and expressing this difference as a percentage of the area located under the extension curve. The stress-strain diagram was developed on an Instron 5500R at a crosshead speed of 2 in/min without any time delay at the end of the extension curve. All samples were of a uniform thickness of 0.075 in.

As apparent from Table I, the thermoplastic urethanes made utilizing an ester intermediate, i.e., Examples 1–5, had poor rebound, even utilizing high molecular weight polyester intermediates and benzene glycol as a chain extender. Thermoplastic urethanes utilizing low molecular weight polyether intermediates outside of the present invention, i.e., less than 1,400, also generally had poor rebound, i.e., Examples 6–10. However, Examples 11–20 which related to the present invention, had very good rebound properties with higher molecular weight values of the polyether intermediate generally having higher rebound values.

Table II shows that improved physical properties were obtained by thermoplastic polyether urethanes of the present invention, i.e., Examples 16 and 18 as compared to Example 2 wherein a polyester intermediate was utilized, or Examples 8 and 10 wherein low molecular weight polyether intermediates were utilized. Yet, Examples 16 and 18 still retained other thermoplastic properties such as good tear strength.

Table III shows good low hysteresis values were obtained utilizing the thermoplastic polyether urethanes of the present invention.

While in accordance with the Patent Statutes, the best mode and preferred embodiment has been set forth, the scope of the invention is not limited thereto, but rather by the scope of the attached claims.

What is claimed is:

1. A thermoplastic urethane polymer, comprising:
   a polyether urethane derived from a diisocyanate reacted with a hydroxyl terminated polyether and a glycol chain extender,
   said hydroxyl terminated polyether having alkylene oxide repeat units containing from 2 to 6 carbon atoms and having a weight average molecular weight of at least 1,400,
   said chain extender being a substantially non-branched glycol having from 2 to 16 carbon atoms,
   wherein the amount of said chain extender is from about 0.7 to less than 1.0 mole per male of said hydroxyl terminated polyether and wherein the thermoplastic urethane polymer has a rebound of at least 60 percent when measured in accordance with ASTM D2632.

2. A thermoplastic polymer according to claim 1, wherein said polyether has alkylene oxide repeat units containing from 2 to 4 carbon atoms.

3. A thermoplastic polymer according to claim 1, wherein said diisocyanate has a total of from 4 to 20 carbon atoms, and wherein the mole ratio of said diisocyanate to said hydroxyl terminated polyether and said glycol chain extender is from about 0.98 to about 1.03.

4. A thermoplastic polymer according to claim 1, wherein said chain extender is an aromatic having a total of from 6 to 12 carbon atoms, and wherein said diisocyanate is an aromatic diisocyanate having a total of from 8 to 16 carbon atoms.

5. A thermoplastic polymer according to claim 1, wherein said hydroxyl terminated polyether has a weight average molecular weight of at least 2500, wherein said polyether is polytetramethylene glycol, and wherein said thermoplastic polymer has a weight average molecular weight of from about 100,000 to about 500,000.

6. A thermoplastic polymer according to claim 1 wherein said polyether is polytetramethylene glycol having a molecular weight of from about 2,500 to about 10,000, wherein said chain extender is benzene glycol, and wherein said diisocyanate is diphenylmethane diisocyanate.

7. A thermoplastic polymer according to claim 1, wherein said polymer has a rebound of at least 65 percent.

8. A thermoplastic polymer according to claim 1, wherein said polymer has a rebound of at least 70 percent.

9. A thermoplastic polymer according to claim 1, wherein the hysteresis of said polymer at 10 percent elongation is 15 percent or less.

10. A thermoplastic polymer according to claim 1, wherein the hysteresis of said polymer at 10 percent elongation is 12 percent or less.

11. A thermoplastic polymer according to claim 6, wherein the hysteresis of said polymer at 10 percent elongation is 6 percent or less.

12. A thermoplastic polymer according to claim 5, wherein said polymer has a rebound of at least 70 percent, and wherein the hysteresis of said polymer at 10 percent elongation is 9 percent or less.

13. A golf ball core, comprising; the thermoplastic polymer of claim 1.

14. A golf ball core, comprising; the thermoplastic polymer of claim 5.

15. A cord, comprising; the thermoplastic polymer of claim 1.

16. A cord, comprising; the thermoplastic polymer of claim 6.

17. A recreational wheel, comprising; the thermoplastic polymer of claim 1.

18. A recreational wheel, comprising; the thermoplastic polymer of claim 6.

19. A profile belt, comprising; the thermoplastic polymer of claim 1.

20. A profile belt, comprising; the thermoplastic polymer of claim 6.

21. An article containing fibers, comprising; the thermoplastic polymer of claim 1.

22. An article containing fibers, comprising; the thermoplastic polymer of claim 6.

23. A process for producing a thermoplastic urethane polymer comprising steps of:

mixing and reacting a hydroxyl terminated polyether, a glycol chain extender, and a diisocyanate, said hydroxyl terminated polyether having alkylene oxide repeat units containing from 2 to 6 carbon atoms and having a weight average molecular weight of at least 1400, wherein the mole ratio of said chain extender to said hydroxyl terminated polyether is from about 0.7 to less than 1.0 and wherein said polymer has a rebound of at least 60 percent when measured in accordance with ASTM D2632.

24. A process according to claim 23, wherein said polyether has alkylene oxide repeat units containing from 2 to 4 carbon atoms, and wherein said diisocyanate has a total of from 4 to 20 carbon atoms.

25. A process according to claim 23, wherein said chain extender is an aromatic glycol having a total of from 6 to 12 carbon atoms, and wherein said diisocyanate is an aromatic diisocyanate having a total of from 8 to 16 carbon atoms.

26. A process according to claim 23, wherein the weight average molecular weight of said hydroxyl terminated polyether is at least 2,500, wherein said polyether is polytetramethylene glycol, wherein said chain extender is benzene glycol, and wherein said diisocyanate is diphenylmethane diisocyanate, and wherein the mole ratio of said diisocyanate to said hydroxyl terminated polyether and said glycol chain extender is from about 0.98 to about 1.03.

27. An article comprising a thermoplastic urethane polymer according to claim 1.

28. An article comprising a thermoplastic urethane polymer according to claim 1, wherein the polymer has a rebound of at least 70 percent when measured in accordance with ASTM D2632.

29. An article comprising a thermoplastic urethane polymer according to claim 1, wherein the polymer has a rebound of at least 75 percent when measured in accordance with ASTM D2632.

* * * * *

UNITED STATES PATENT AND TRADEMARK OFFICE
CERTIFICATE OF CORRECTION

PATENT NO. : 5,959,059
DATED : September 28, 1999
INVENTOR(S) : Ravi Ram Vedula and Stanley Raymond Goscewski It is certified that error appears in the above-identified patent and that said Letters Patent is hereby corrected as shown below:

In claim 1, line 40, please delete "male" and insert --mole-- therefor.

Signed and Sealed this

Eleventh Day of April, 2000

Attest:

Attesting Officer

Q. TODD DICKINSON

Director of Patents and Trademarks